July 7, 1942.  S. A. KRETCHMAN  2,288,908
DOUGH CUTTING AND SHAPING MACHINE
Filed Feb. 21, 1940  5 Sheets-Sheet 1

July 7, 1942.  S. A. KRETCHMAN  2,288,908
DOUGH CUTTING AND SHAPING MACHINE
Filed Feb. 21, 1940  5 Sheets-Sheet 2

Inventor:
Stanley A. Kretchman
By Ambs, Phinn, Olsen & Mecklenburger Attys.

July 7, 1942.  S. A. KRETCHMAN  2,288,908
DOUGH CUTTING AND SHAPING MACHINE
Filed Feb. 21, 1940  5 Sheets-Sheet 3
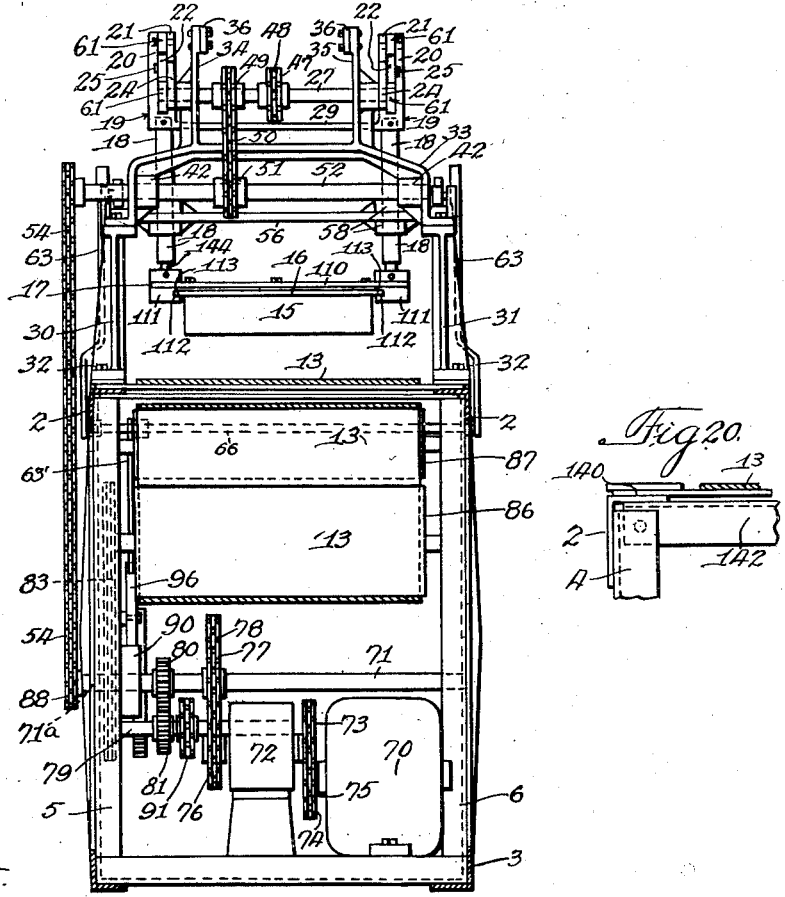
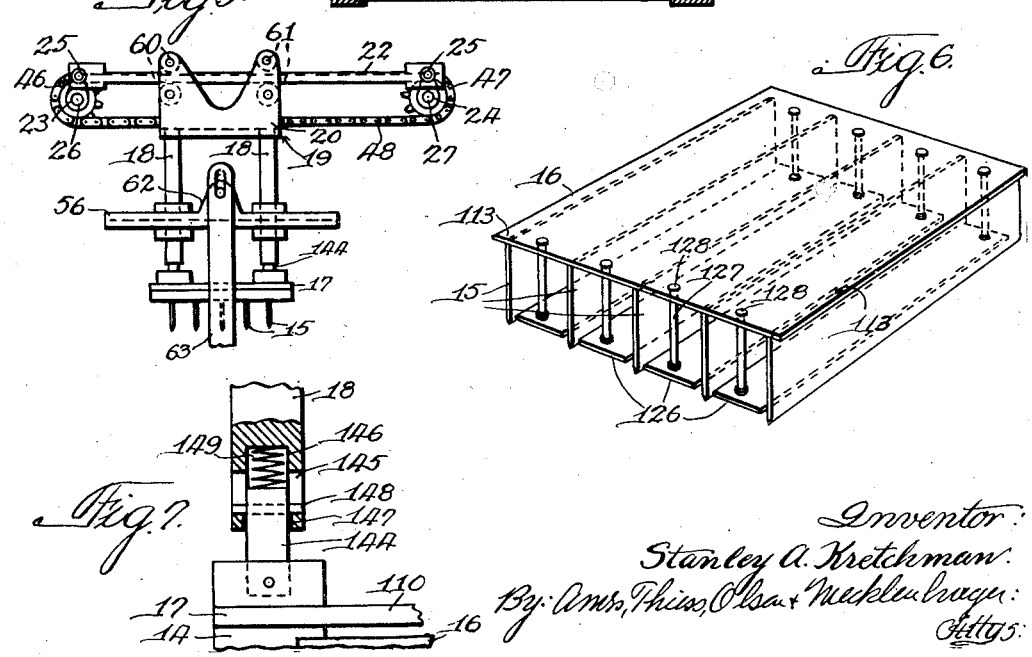
Inventor:
Stanley A. Kretchman.

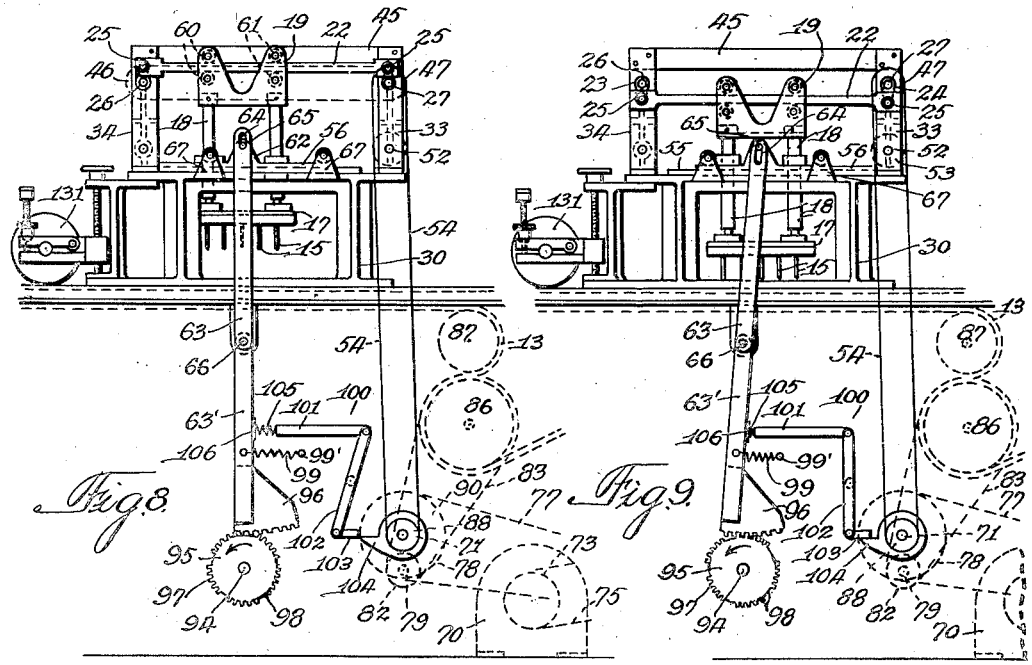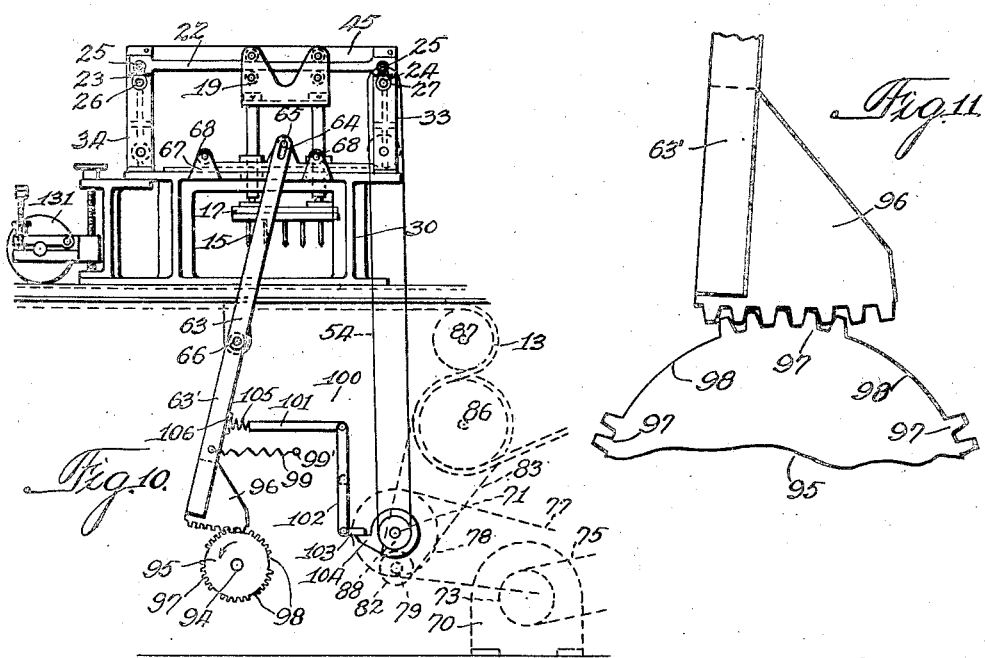

July 7, 1942.   S. A. KRETCHMAN   2,288,908
DOUGH CUTTING AND SHAPING MACHINE
Filed Feb. 21, 1940   5 Sheets-Sheet 5
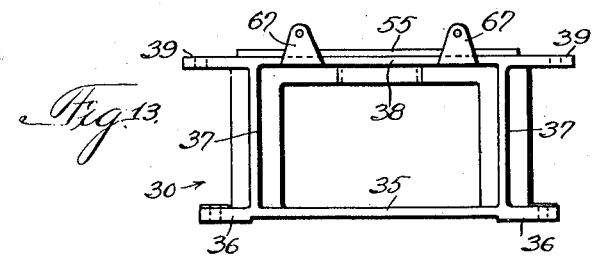
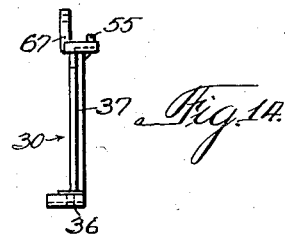
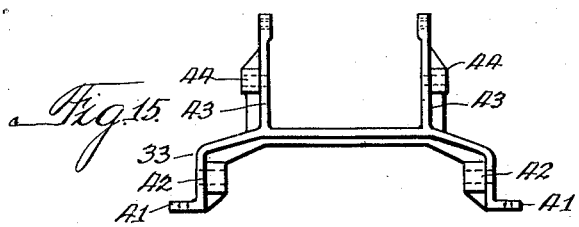
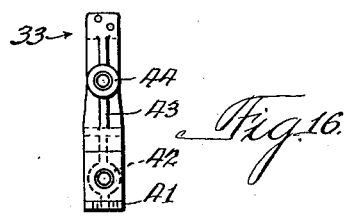
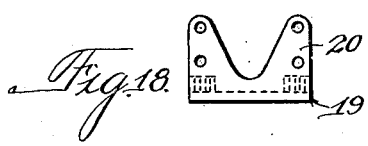
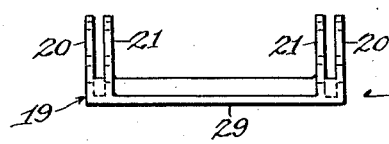
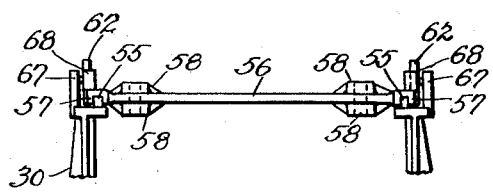
Inventor:
Stanley A. Kretchman
By: Ames, Thiess, Olson & Mecklenburger
Attys.

Patented July 7, 1942

2,288,908

UNITED STATES PATENT OFFICE 2,288,908

DOUGH CUTTING AND SHAPING MACHINE

Stanley A. Kretchman, Chicago, Ill.

Application February 21, 1940, Serial No. 320,108

11 Claims. (Cl. 107—21)

This invention relates to dough cutting and shaping machines.

Machines of this type are usually employed in the making of rolls, buns, biscuits, cookies, crackers, etc., and are designed to cut pieces of predetermined sizes and shapes from strips of dough moving past the cutters on a traveling conveyor. It is quite essential in the cutting of dough that the action be quick and preferably perpendicular to the dough if the cut is to be straight and sharply made and without disturbing the dough for the next cut. Difficulties arose, however, in the construction of machines heretofore used to cut and shape dough. Various arrangements were provided for the cutters so that they would effect a cutting operation upon the dough as it would be fed past the same on a traveling conveyor. It seemed quite essential in certain structures to arrange the cutters in the form of a drum and to move or rotate the same either by movement of the conveyor as the cutters engaged the conveyor or by a separate drive. The kind of cut produced by this arrangement was unsatisfactory because the cutters entered the dough on an arc and caused a slanting cut that pulled the dough, closed it on a slant on one side and made a very undesirable inwardly slanting undercut on the other side. In other words, the pieces cut would not have perpendicular sides but a peculiar shape that gave a distorted appearance. Another suggestion of cutter arrangement involved a vertical movement for the cutters but to prevent slippage or disturbance of the dough relative to the conveyor due to it being in continuous motion, the conveyor had to be stopped for each cutting operation. The delay caused by such repeated stopping and starting of the conveyor was very objectionable. The mechanism necessary to effect such an operation of the conveyor, as well as the presence of a slight slippage of the conveyor relative to the position of the cutters each time the conveyor stopped and started, made this arrangement the least desirable. Slippage of the conveyor caused variations in the size of pieces which made production difficult and gave a less marketable product. Moreover, a certain amount of slippage was also present between the dough and the conveyor where the cutters rotated due to the pulling action between the cutters and the dough and the movement of the conveyor.

An object of the invention resides in the provision of a new and improved machine for cutting and shaping dough adapted to overcome the above difficulties and to be provided with mechanism for effecting a straight cut without any pulling of the dough, variations in sizes of the cut, or requiring the conveyor to stop for each operation. These results are accomplished by a structure providing a perpendicular or substantially perpendicular movement of the cutters relative to the conveyor and a cutting operation by these perpendicularly moving cutters that does not require the conveyor each time to be stopped.

Specifically, the invention is directed to an improved type of machine for cutting and shaping dough having mechanism providing a new and novel movement for the cutters whereby the cutters move in the same direction and at the same speed as the conveyor while these cutters are moving perpendicularly to effect a cutting operation.

A further object of the invention is to provide a predetermined relation between the movement of the cutters, while traveling in the direction of the conveyor and at its speed, and the distance the conveyor travels during each cycle of operation whereby the cutters will be returned to their original position and ready for the next operation as the advancing edge of the dough moves forwardly for the next cutting.

A still further object of the invention is to provide cutting means including cutter mounting means adapted interchangeably to receive cutters arranged to cut different lengths and have different cutting capacities with respect to the total cut from the advancing edge of the dough upon each cutting operation and means associated with or forming a part of the drive for maintaining said predetermined relation between the distance traveled by the cutters moving in the direction of the conveyor and the distance traveled by the conveyor during each operation whereby different sized cutters may be readily used by the machine disclosed herein, to produce different sizes or kinds of cuts without affecting the continuous operation of the machine.

This is accomplished by means adapted to vary the stroke of the cutters in the direction of the movement of the conveyor proportionately to the size of the total cut to be made upon the advancing edge of the dough for each cutting operation. In this manner any type or size cutters may be readily used without interfering with the operation of the machine to cut continuously from the advancing edge of the dough on a continuously moving conveyor.

Other objects and advantages of the invention will be apparent from the following detail description when taken in connection with the accompanying drawings.

In the drawings:

Fig. 1a is a front view of a device for stripping the dough before it is subjected to the cutting operation;

Fig. 4 is a transverse section of the machine to illustrate this driving mechanism, cutting mechanism and connections therebetween;

Fig. 5 is a detail view of the cutting carriage and the eccentric drive that causes the cutters to move perpendicularly against the dough on the conveyor;

Fig. 6 is a perspective view of one form of cutter head adapted to be mounted upon the cutter carriage, this cutter head illustrating a plurality of cutters and dough stripping devices adapted to be carried therebetween.

Fig. 7 is a detail sectional view through one of the four rods forming part of the cutting means and carrying a cutter carriage supporting the cutter head and illustrating a resilient connection adapted to compensate for any overtravel of the cutting mechanism after the cutters have moved downwardly to the limit of their stroke to effect a cutting operation;

Fig. 8 is a detail view illustrating the position of the parts when the cutters are in a starting position and about to effect a cutting operation;

Fig. 9 is a similar view illustrating the position of the parts at the time the cutters are penetrating the dough on the conveyor and effecting a cutting operation;

Fig. 10 is a similar view illustrating the position of the parts after cutting operation is completed and the cutters are about to be returned to their position, as shown in Fig. 8;

Fig. 11 is an enlarged detail view of that portion of the driving mechanism for the cutters that predetermines the distance the cutters travel with the conveyor during the cutting operation;

Fig. 12 is a perspective view of another form of cutter head that may be used which employs a combination of cutters and crunchers;

Fig. 13 is a side view of one of the members of the frame structure supported above the conveyor;

Fig. 14 is an end view of the same;

Fig. 15 is a side view of another of the members comprising this frame structure supported above the conveyor;

Fig. 16 is an end view of the same;

Fig. 17 is a side view of the upper frame member of the cutting device;

Fig. 18 is an end view of the same;

Fig. 19 illustrates the means provided to effect a reciprocal movement of the cutting means in a plane parallel to the conveyor;

Fig. 20 is a detail sectional view through one side of the upper corner of the machine outside of the immediate area of the drive mechanism and cutting device for supporting the upper run of the conveyor;

Fig. 21 is a side view of one form of product cut by the machine disclosed herein to illustrate the vertical sides formed on this product as the result of the perpendicular cutting action of the cutters with respect to the dough on the moving conveyor;

Fig. 21a is an end view of the same product;

Figure 1:
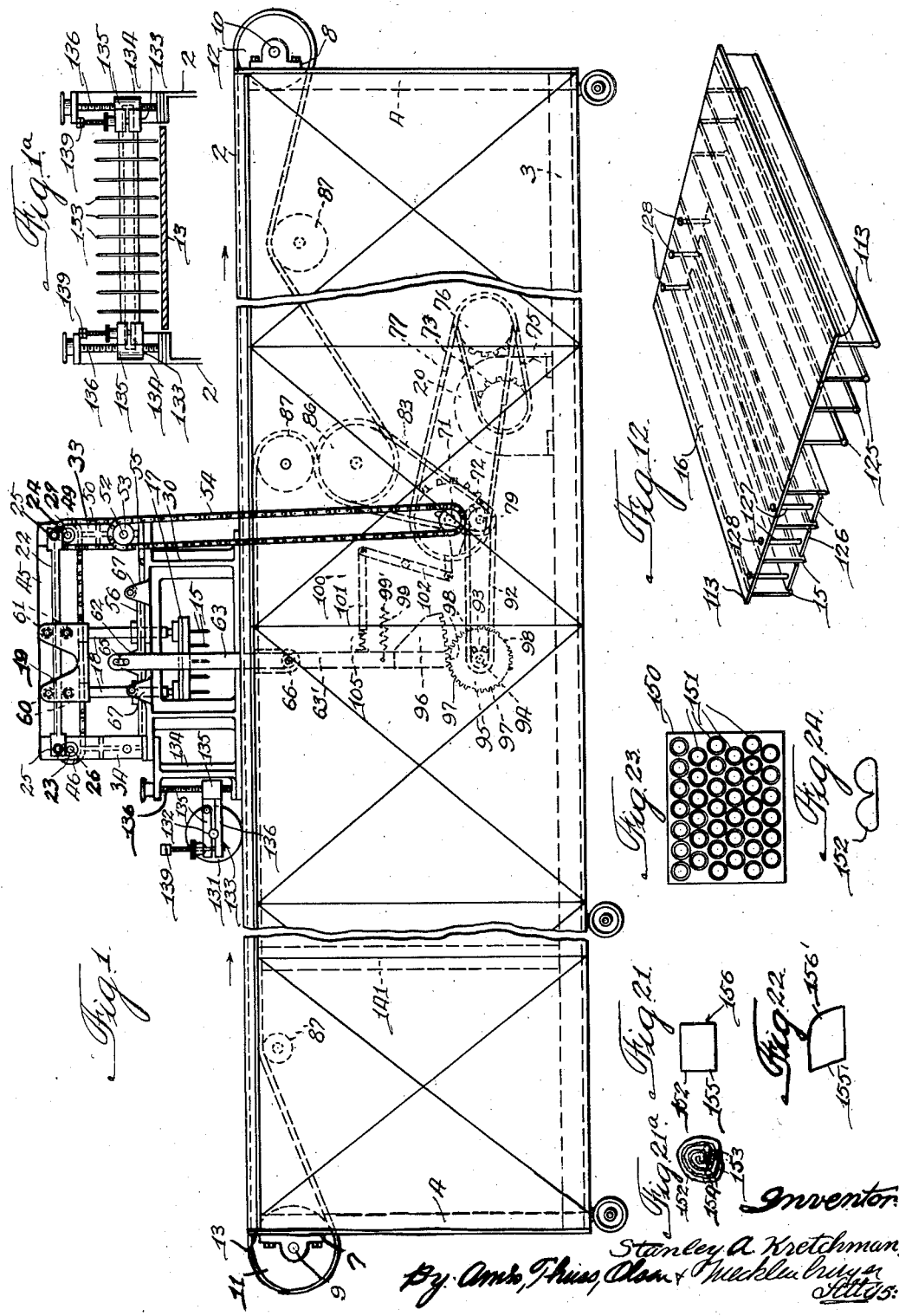
Figure 1 is a side elevation of the machine embodying the present invention.

Fig. 22 is a view similar to Fig. 21 but showing the same piece of dough cut by machines of the prior art having the cutters arranged about a drum and rotating as the conveyor moves past the same, illustrating an undesirable slanting surface of one side and the manner in which the cutters pull the outside layer of the dough over the opposite side to close the same and cause a blind end as the result of the cutters approaching the dough in an arc during the cutting operation;

Fig. 23 is a bottom plan view of another form of cutter head that may be used to cut circular objects, such as doughnuts or similar pastry goods; and Fig. 24 illustrates a product cut by the present machine and crunched by the crunchers carried by the cutter head illustrated in Fig. 12.

The parts of the machine disclosed herein may be carried upon any suitable frame structure which may comprise, for example, a plurality of upper and lower longitudinal members 2 and 3, connected by end members 4 and intermediate members 5 and 6 disposed at opposite sides of the frame structure. These latter members are of a shape and size to support a majority of the parts of the drive mechanism. End members 4 may support bearings 7 and 8 to receive shafts 9 and 10, which carry end rollers 11 and 12 for an endless conveyor 13. The upper run of conveyor 13 may be positioned to travel in the direction of the arrows shown in Fig. 1 between upper frame members 2 and comprises the traveling table of the machine which receives dough at the left-hand end and feeds it past a plurality of cutters 15 suitably supported in a cutter head member 16 removably carried by a carriage 17 that is adapted to reciprocate in a plane parallel or substantially parallel to conveyor 13 and move perpendicularly or substantially perpendicularly with respect to conveyor 13 to bring cutters 15 into cutting relation with dough on conveyor 13.

Cutter carriage 17 is supported by any suitable means, which, in the drawings, is disclosed as a plurality of rods 18 arranged in pairs on opposite sides of the machine. As illustrated in Figs. 4 and 5 and Figs. 17 and 18, each pair of rods 18 on opposite sides of the machine is fixed to a casting 19 formed on each side as two parallel plates 20 and 21 connected together at their lower ends to receive the upper ends of rods 18, the bottom connection 28 extending crosswise of the machine so as to dispose these parallel plates 20 and 21 on opposite sides and provide means for receiving the means that causes the cutting device, designated broadly as A, to move substantially parallel to conveyor 13 and perpendicularly to the same to effect a cutting operation. This means may comprise a bar 22 provided on each side of casting 19 and forming a track to lie between parallel plates 20 and 21. Plates 20 and 21, on each side, are furnished with rollers 60 and 61 between which bar 22 rides. Bar 22 is connected at opposite ends to plates 23 and 24 by means of eccentric connections 25. Plates 23 and 24 are carried upon shafts 26 and 27, respectively, supported upon a frame structure extending crosswise of and above conveyor 13. Casting 19 is shown in detail in Figs. 17 and 18.

Figure 2:
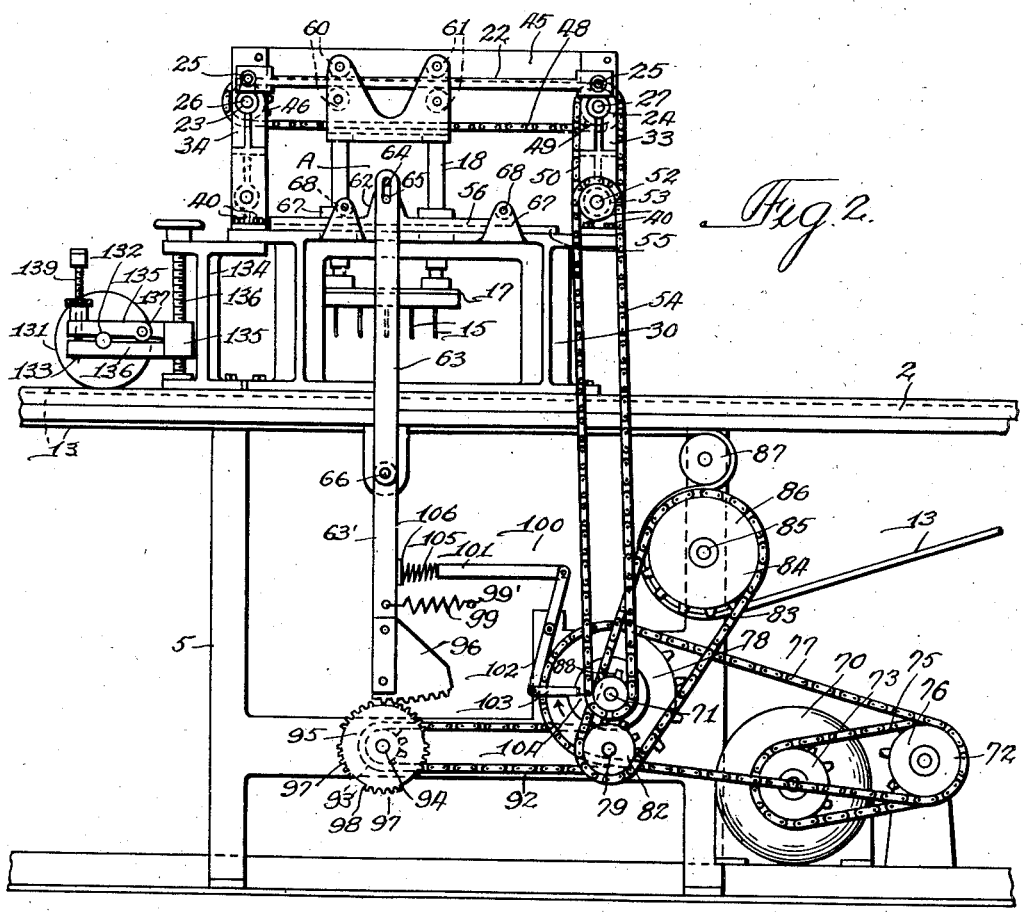
Fig. 2 is an enlarged side elevation of a limited portion of the machine to illustrate the cutting mechanism and the drive for this cutting mechanism and the conveyor.

The frame for carrying the cutting mechanism above conveyor 13 may comprise two lower frame members 30 and 31 longitudinally disposed along opposite upper frame members 2 and two frame members 33 and 34 transversely disposed upon frame members 30 and 31. Lower frame members 30 and 31 are shown in detail in Figs. 13 and 14. Each comprises a base strip 35 having feet 36 at opposite ends adapted to be bolted along one of the upper longitudinal frame members 2 above intermediate members 5 and 6. Webbed vertical sides 37 support a flanged top member 38 having its opposite ends 39 provided with bolt openings for receiving bolts 40 attaching frame members 33 and 34 crosswise thereof at these ends 39. Frame members 33 and 34 are shown in detail in Figs. 15 and 16. Each comprises a lower portion resembling an inverted U, having feet 41 through which bolts 40 pass. Adjacent feet 41 are bearings 42 for carrying a transverse shaft to be hereinafter described. Upstanding arms 43 are also provided with bearings 44 and are drilled at their upper part to receive fastening means securing a cross bar 45 on each side, as shown in Figs. 1 and 2. Cross bars 45 are placed between the upper ends of these frames 33 and 34 along opposite sides of the machine firmly to tie these members together at the upper ends.

Shafts 26 and 27 are adapted to be carried by the bearings 44 of these frame members 33 and 34. Sprockets 46 and 47 are mounted upon shafts 26 and 27 and have a chain 48 therebetween. Another sprocket 49 is adapted to be carried upon shaft 27. Sprocket 49 is driven by a chain 50, entrained over a sprocket 51, carried by a shaft 52 and supported by bearings 42 of frame member 33. One end of shaft 52 extends beyond adjacent bearing 42 to carry a sprocket 53 driven by a chain 54 extending downwardly to the drive mechanism to be presently described. It will be understood that a similar drive may also be provided for the opposite end of shaft 52, if so desired. In this manner, shafts 26 and 27 are driven so as to rotate plates 23 and 24 on their outer ends respectively, the eccentric connections 25 causing bar 22 to move up and down and thereby impart a vertical movement to cutters 15 to effect a cutting operation.

Figure 3:
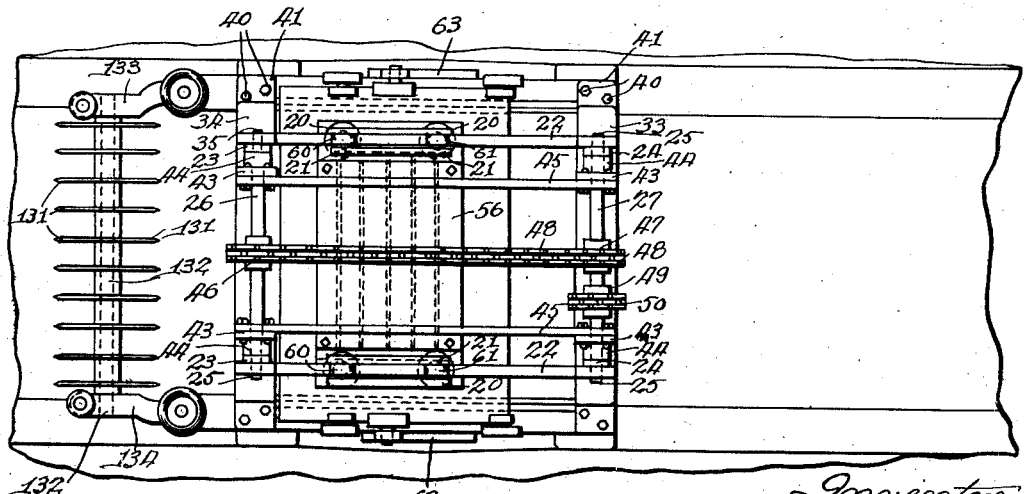
Fig. 3 is a top plan view of the structure shown in Fig. 2.

The mechanism for moving cutter device A parallel or substantially parallel to the upper run of conveyor 13 while bar 22 moves back and forth in effecting a cutting operation will now be described. The upper surface of the flanged top of each frame member 30 and 31 is adapted to be provided with a track 55 upon which a plate 56 is adapted to ride. Plate 56 is illustrated in detail in Fig. 19 to show the manner in which its ends rest upon track 55. Plate 56 is a part of cutting means A and has rods 18 passing therethrough. The ends of plate 56 are longitudinally grooved at 57 to receive the tracks 55. Bearings 58 on plate 56 act as guides for the vertically moving rods 18. With rods 18 passing through bearings 58, reciprocating movement of plate 56 in a horizontal plane will move these rods 18 also in a horizontal plane and cause casting 19 likewise to move by means of rollers 60 and 61 riding along bar 22. Plate 56 thus forms a part of cutting device A. It is provided with an ear 62 on each side, to which is connected a pivotally mounted actuating lever 63 extending downwardly below the conveyor 13 to the drive mechanism, being pivotally carried by a shaft 66 extending crosswise of the machine under conveyor 13 and driven by a link 63' on one side, as will be later explained. The upper end of each lever 63 is provided with an elongated slot 64 for receiving a pin 65 extending from ear 62. When levers 63 are swung about their pivot point 66, it will effect a reciprocal movement of plate 56 upon track members 55 carried by the upper part of said frame members 30 and 31. To keep plate 56 upon track members 55, frame members 30 and 31 are each provided with a pair of upstanding brackets 67 that carry inwardly positioned rollers 68 adapted to bear against plate 56 along its side edges (see Figs. 2, 3 and 19).

The driving mechanism comprises any source of suitable power, such as a motor 70, driving a shaft 71 through a gear reduction 72. Suitable sprockets 73 and 74 and a chain 75 therefor comprise the drive between motor 70 and gear reduction 72. A second sprocket 76 associated with gear reduction 72 drives a chain 77 that extends over a sprocket 78 fixed to shaft 71. Shaft 71 drives another shaft 79 by means of intermeshing gears 80 and 81 (see Fig. 4). Sprocket 82 on shaft 79 drives a chain 83, which, in turn, drives a sprocket 84 fixed to a shaft 85 upon which conveyor roller 86 is mounted. Conveyor 13 is driven by roller 86. As illustrated in Fig. 1, the lower run of conveyor 13 may be guided by any number of suitably located idlers 87.

The outer end of shaft 71 is provided with a sprocket 88 for driving chain 54 which drives sprocket 53 upon shaft 52 for the purpose of operating eccentric connections 25. A suitable clutch 90 may be interposed between sprocket 88 and gear 80 which drives shaft 71. Clutch device 90 may be of the type known as a one-revolution clutch adapted to effect a driving connection between its driving and driven parts for a single revolution of the same. It will be understood that shaft 71 comprises in fact two parts, 71 and 71a, the separation being at clutch 90 so that part 71 is connected to the driving member of the clutch and the other part 71a is connected to the driven member thereof. As will be presently explained, each time clutch 90 is tripped sprocket 88 will be driven one complete revolution. This action will drive shafts 26 and 27 and rotate plates 23 and 24 one revolution, whereby to actuate eccentric connections 25 to which bar 22 is connected. This movement of plates 23 and 24 will cause bar 22, through these eccentric connections, to impart a vertical movement to cutting device A. Cutting device A will not be affected by any movement of bar 22 in a horizontal direction as the result of eccentric connections 25 being carried by plates 23 and 24, due to the sliding arrangement provided between bar 22 and casting 19 at rollers 60 and 61. Neither will this horizontal movement of bar 22 affect the movement of the cutting device in a horizontal direction, bar 22 and cutting device A each being freely movable with respect to each other by virtue of the roller suspension of casting 19 upon this bar 22.

Shaft 79 is also provided with a sprocket 91 adapted to drive by means of a chain 92 a sprocket 93 on a shaft 94. Like the other shafts herein described, shaft 94 is mounted in any suitable way upon the frame structure of the machine. As illustrated in Fig. 2, the various parts of the driven mechanism may be compactly arranged in mounted relation upon intermediate frame members 5 and 6, or other parts of the frame structure in close proximity thereto. A pattern gear 95, or like driving element, is fixedly carried upon shaft 94 near one end. Pattern gear 95 functions to drive pivotally mounted actuating levers 63 in a predetermined timed relation with respect to those parts driving conveyor 13, whereby cutting device A may be moved in the same direction as conveyor 13, a predetermined distance on each operation with respect to the distance conveyor 13 moves. In the embodiment specifically disclosed herein, this forward stroke of cutting device A in the direction of travel of conveyor 13 is equal to one-half of the distance conveyor 13 travels for each cycle of operation. This is accomplished by attaching a toothed segment 96 to the lower end of link 63' so that teeth on pattern gear 95 will mesh with teeth on segment 96 to swing link 63' in a clockwise direction about its shaft 66. The number of teeth on pattern gear 95 engaging teeth on segment 96 for a single cutting operation will determine the extent of the swing of link 63'. This is accomplished by dividing the periphery of pattern gear 95 into a number of alternate toothed portions 97 and blank portions 98. As the teeth of a toothed portion move past segment 96, they engage the teeth of the latter and swing it clockwise a predetermined distance whereupon a blank portion 98 will move into position below the teeth of segments 96 and disengage segment 96 from driving relation with pattern gear 95. Spring 99 attached to link 63' immediately returns the lower ends of this link 63' by a quick movement. End 99' of spring 99 may be attached to any fixed portion of the machine.

A trip mechanism, designated broadly as 100 and comprising a trip link 101, a pivoted link 102 and a clutch dog 103, is arranged to be actuated by link 63' in order to withdraw clutch dog 103 from engagement with clutch shoulder 104 on clutch 90. Clutch 90 will then connect the drive portion of shaft 71 with the driven portion 71a carrying sprocket 88 driving the connection 54 which extends to the upper part of the machine and drives eccentric connections 25 one revolution to effect a cutting operation by vertical movement of cutting device A. A spring 105 is interposed between the free end of trip lever 101 and a shoulder 106 on link 63'. The sudden return movement of this link 63', by means of spring 99, will cause clutch dog 103 to be quickly kicked out of engagement with clutch shoulder 104 through spring 105, trip link 101 and pivoted link 102. Clutch shoulder 104 is adapted to rotate clockwise as shown by the arrow in Fig. 2. As soon as it has made a complete revolution, further operation of the clutch will be checked by clutch dog 103 again lying in the path of clutch shoulder 104 so that the clutch is limited in its operation to a single revolution. Hence, cutters 15 will be brought vertically toward and against conveyor 13 to effect a cutting operation of the dough each time gear 95 operates to swing actuating link 63' in the manner described to effect movement of these cutters 15 in the same direction as the travel of conveyor 13. I find it preferable that cutters 15 move or travel at the same speed as conveyor 13 when moving in the same direction so that there is no relative movement in a horizontal direction between cutters 15 and conveyor 13 to allow any shifting or similar disturbance of the dough as cutters 15 enter and cut the same. I also find it very desirable to effect a quick vertical movement of cutters 15 during the cutting operation in both cases. A clean perpendicular cut of the dough will be obtained by each cutter and any tendency to cause deformation of the perpendicular walls formed by the cut will be obviated.

As previously mentioned, cutters 15 are carried by cutter head 16. These parts may be arranged as a removable unit with respect to cutter carriage 17 (see Fig. 6). By referring to Fig. 4, carriage 17 may comprise a casting formed as a plate 110 having bars 111 secured to the underside along the longitudinal edges. These bars may be slotted at 112 so as to receive ends 113 of cutter head 16 that are arranged to project beyond the vertical edges of cutter blades 15. Consequently, the cutter head and blade unit may be readily withdrawn from cutter carriage 17 to permit another cutter head and blade unit to be inserted which may be provided with a different arrangement of blades to effect cuts of different lengths and have different cutting capacities with respect to the total cut from the advancing edge of the dough upon each cutting operation. For example, instead of five cutting blades 15, as shown in Fig. 6, to produce five individually cut pieces of the same length for each cutting operation, a different number of cutter blades 15 may be used to produce a correspondingly different number of cut pieces, the total dimensions of which may be the same as the five pieces cut by the unit shown in Fig. 6, or a different total dimension, so that the cutting area upon each cutting operation will be different. If certain types of pastries are to be made and it is desirable to cut the dough thereof into single lengths, a single cutter 15 could be used. In this event, the length of the cut would undoubtedly be different than the total cut made from the advancing edge of the dough upon each cutting operation by the unit shown in Fig. 6. If such a change in the total cut to be made or the total capacity of the cutting unit is desirable, it will be apparent that the horizontal stroke or distance of travel of the cutting unit in the direction of travel of conveyor 13 will be different than for the cutting unit illustrated in Figs. 1 and 2, in order that the aforesaid predetermined relation between this horizontal stroke of the cutting unit and the distance the conveyor travels upon each cycle of operation shall be maintained. If this predetermined relation is not maintained, as heretofore explained, conveyor 13 will travel at a rate that will not conform to the amount of dough cut from the advancing edge as it is fed past the cutters for each cutting operation. The result will be that waste areas will occur between each cutting operation if conveyor 13 is moving too fast or not enough dough will be advanced for each vertical stroke of cutters 15 to permit a complete cut if conveyor 13 is moving too slowly.

Inasmuch as the machine disclosed herein will be used at various times during the day for cutting and shaping rolls, buns, doughnuts, biscuits, cookies, crackers, etc., whether made of leavened or unleavened dough, plain dough, Danish dough or rolled-in dough, the utility of the machine will be greatly enhanced if a quick change can be made to provide cuts of different sizes without a complete knockdown and reassembly of the parts of the driving mechanism being required. The arrangement provided herein preferably permits the same speed for conveyor 13 at all times. This is desirable because operators working along the moving table of this machine, which may be of any desirable length at each end as illustrated in Fig. 1, readily become accustomed to a certain speed and work more efficiently if the speed remains constant than they would if the speed is changed for each different type of article cut. Consequently, one of the improved features of the invention is directed to a simple change that may be made in the drive mechanism to compensate for different sized goods taken from the advancing edge of the dough when different sized cutters are employed. As stated previously, the movement forwardly of cutting means A with respect to the distance traveled by the conveyor on each cycle of operation is a fixed ratio to be maintained irrespective of the size of cut made upon each cutting operation. In this manner, the speed of conveyor 13 may remain constant and cutters 15 will move in the direction of travel of conveyor 13 at a rate of speed placing cutters 13 in a position ready for a cutting operation when the advancing edge of the dough on the conveyor has moved forwardly equal to the amount of dough cut therefrom on each operation. To this end, pattern gear 95 may be readily removed and replaced by a pattern gear having toothed portions 97 with a smaller or greater number of teeth to vary the swinging movement of link 63'. The rotation of pattern gear 95 is in timed relation to the drive of conveyor 13, whereby conveyor 13 and cutting means A will move in the same horizontal direction at the same rate of speed. A smaller cut from the advancing edge of the dough in one operation of cutters 15 will not require as great a distance of travel of cutting means A forwardly in a horizontal direction as will be necessary when cutters 15 effect cuts of greater length from the advancing edge of the dough upon each cutting operation. Consequently, fewer teeth are employed on toothed portions 97 and blank portions 98 are shorter so that the cutters 15 will be returned to the left sooner in order to be ready for next cutting operation. From this explanation it will be apparent to those skilled in the art that by merely changing the number of teeth and the dimension of blank portions 98, the forward horizontal stroke of cutting means A may be changed as desired and thereby permit the use of cutters spaced apart at different distances to effect a different total cut from the advancing edge of the dough upon each cutting operation without disturbing the relation between the distance conveyor 13 moves and the distance cutters 15 move for each cutting operation of the machine.

Figs. 8, 9, and 10 illustrate the various positions of cutting device A and the parts of the drive mechanism during a single cycle of operation. In Fig. 8, cutting device A is in a starting position to effect a cutting operation. It has just been returned to the left as the result of spring 99 exerting a pull upon the lower end of link 63' and this link 63' being free to move counterclockwise as the result of the teeth of a single toothed portion 97 on pattern gear 95 riding out of mesh with the teeth on segment 96 and a blank portion 98 coming opposite these teeth on segment 96. In this manner, the lower end of link 63' is free from the driving force from pattern gear 95 and is caused to return counterclockwise to the position shown in Fig. 8. This return movement of link 63' engages trip link 101 and causes clutch dog 103 to be thrown out of engagement with clutch shoulder 104 of clutch 90, this being illustrated in Fig. 8. Immediately clutch 90 makes a single revolution to drive chain 54, and consequently this causes eccentric connections 25 to effect a single revolution which swings cross bars 22 downwardly and thus cutting device A, this position thereof being shown in Fig. 9. A cutting operation of cutters 15 is thus effected. However, during this vertical downward movement of cutting means A, the teeth of the next toothed portion 97 of pattern gear 95 will start meshing with the teeth of segment 96, whereby this segment again moves to the left to swing actuating link 63' clockwise. Such movement of link 63' causes actuating levers 63 to move cutting means A in a horizontal direction substantially parallel to the moving conveyor 13, the timing being such that cutting means A moves at the same rate of speed as conveyor 13.

Fig. 10 illustrates the end of the forward movement of cutting means A. In this position the last tooth of the intermeshing toothed portion of pattern gear 95 is riding out of mesh with the teeth of segment 96. As soon as this last tooth is free of the tooth of segment 96, the following blank portion 98 will allow spring 99 again to swing actuating lever 63 counterclockwise and move cutting means A to the left in the position as shown in Fig. 8. It will be clear from this description that cutting means A effects a cutting operation by the cutters while the cutters are moving in a perpendicular direction with respect to conveyor 13 and while these cutters 15 are at the same time moving in the same direction and at the same rate of speed as conveyor 13. Consequently, a clean and quick cut may be effected without causing any disturbance of the dough on traveling surface 13. A perpendicular cut is effected which eliminates slanting sides of the individual pieces cut by the cutters.

It will also be understood that the present invention is directed to shaping the dough as well as cutting. A cutter head 16 having shaping devices may be substituted for a cutter head having cutters 15, or a cutter head 16 having a combination of knives and shapers may be used. Fig. 12 illustrates a cutter head having a series of cutters 15 and a series of crunchers 125. The operation of the machine may be so timed that crunchers 125 may be in advance of cutters 15 so that as the cutting head descends, crunchers 125 will shape the pieces cut by cutters 15 of the previous operation.

Figs. 6 and 12 illustrate the manner in which strippers 126 may be used to prevent dough, as it is cut, from clinging to cutters 15. Strippers 126 may be fixed to the bottom of a series of pins 127 freely movable through openings in cutter head 16. Pins 127 may have heads 128 to prevent these pins 127 from passing through these openings in cutter head 16. Strippers 126 will be slightly less in width than the distance between adjacent cutters 15. As cutters 15 enter the dough, strippers 126 are raised the thickness of the dough. As cutters 15 are withdrawn from the dough, strippers 126 will gently drop downwardly and exert a gentle pressure against any dough tending to cling to the sides of cutters 15.

If it is desirable, the sheet of dough fed upon conveyor 13 may be first stripped before it is fed to cutters 15. In the making of certain products, sizes of pieces will vary. They will vary in width as well as in length. This stripping may be accomplished by a plurality of vertically spaced rotating cutters 131 mounted upon a shaft 132, freely suspended at its ends in brackets 133 carried by a frame member 134.

Brackets 133 may have vertical bearings 135 carried upon feed screws 136. These feed screws 136 are used to adjust brackets 133 according to the diameter of cutter blades 131 that are used. Shaft 132 may be easily removed either to permit removal of knives 131 or to permit replacement of knives differently spaced therealong. This is accomplished by a split arrangement of the outwardly extending arms of brackets 133, these arms being divided into two parts 135 and 136. Parts 135 are pivoted at 137 so that they may be swung back to readily release the ends of shaft 132 therefrom. Movable parts 135 may be locked in position, as shown in Fig. 2, by an adjustable device 139.

Due to the length of conveyor 13, it may be found desirable to support the upper run by a flat plate 140, as illustrated in Fig. 20. Plate 140 may be carried upon upper frame members 2 connected at the ends by end members 4 and by any number of vertical frame members 141 disposed between the ends of the machine and connecting upper and lower frame members 2 and three together, as illustrated at the left-hand end of Fig. 1. The machine may also be braced transversely by cross members 142. It will be understood that the construction of the frame of the machine may be varied in accordance with the requirements of the installation or the length and width of the machine to be built.

Conveyor 13 in a machine of the type disclosed is usually of considerable length, and consequently, it will be difficult to maintain a fine adjustment between the vertical stroke of the cutters and the position of the upper run of the belt so as to assure a cut through the dough on each operation and a stopping of the cutters in their downward motion when their cutting edges strike the top face of the upper run of the conveyor. Any twisting strain on such a long frame may cause the centers of, say, the end rollers to change slightly, which will raise or lower the upper run of the conveyor slightly, but enough to effect the vertical operating stroke of the cutters. To compensate for such variations and still assure that cutters will effect a complete cutting operation of the dough being fed past the cutters by conveyor 13, there is preferably provided a resilient connection between cutter carriage 17 carrying cutter head 16 and rods 18. The structure used for this purpose may be varied, but Fig. 7 illustrates one form that may be employed. Rods 18 may terminate short of the bearings which receive pins 144 in fixed relation. These rods 18 may be slotted at 145 near their lower ends and be provided with a recess 146. Pins 144 extend upwardly through openings 147 in the bottom of rods 18 and have key pins 148 lying transversely therethrough and in slots 145. Spring 149 may be disposed in recesses 146 and bear against the upper end of pins 144. The resilient connection thus provided permits rods 18 to continue traveling downwardly for a limited distance after the cutting edges of cutters 15 have cut through the dough and touched the face of conveyor 13. This resilient connection eliminates the need of a fine adjustment in the stroke of cutting device A with respect to the position of conveyor 13, which is not only difficult to make but difficult to maintain when endless conveyors are of considerable length. Moreover, cutters 15 may wear from time to time with the result that the vertical cutting stroke will vary. The resilient connection disclosed herein will compensate for this wearing of the cutters.

Fig. 23 illustrates another form of cutter head 150 having circular cutters 151 that may be used in cutting circular pieces of pastry, such as doughnuts or the like. It will be understood that I contemplate employing cutting devices or knives on the cutting head used in the machine disclosed herein that will have various shapes and sizes in order to cut pieces of dough of practically any shape or size. To this end, there is no limit to the broad adaptation of any kind of head for carriage 17.

To illustrate the vertical cut made by cutters 15, I have shown one form of product made by the machine disclosed herein. This product is designated 152 in Figs. 21 and 21a, and may be, for the purposes of this disclosure, a pastry known as a cinnamon roll made by a number of rolled-in layers of dough 153 with a filler 154 between the layers. When this product is baked, the vertical sides 155 and 156 become the top and bottom thereof. Consequently, it is desirable that a clean perpendicular cut be made so that there will be no pull on the layers of dough as the cutters move therethrough, nor any disturbance that may cause the layers of filler 154 to be dislodged. By the use of the machine disclosed herein, the cutting operation is quickly made and is perpendicular to the dough so that the cutters will move through the dough and effect a clean cutting action in a very effective and quick manner. The sides 155 and 156 of the piece cut will be perpendicular with respect to its opposite faces and the layers of filler 154 will not be disturbed. Fig. 22 illustrates a similar product as made heretofore, where the cutters are arranged to move on a rotating drum that brings each cutter against and into the dough in an arc so that the receding face 155' of each piece cut is on a slant and forms an undercut that is very undesirable. The advancing side 156' of the next piece is formed as illustrated in Fig. 2, as the result of the cutter pulling the top layer of the dough downwardly to form a blind side. This side 156' will also slope in the same general direction as the opposite side 155'. Hence, a product will be produced which will not have its top and bottom faces perpendicular with the other sides.

To illustrate the crunching action performed by crunchers 125, I have shown in Fig. 24 product 152 after it has been crunched by said crunchers 125. It will be understood that the term crunching is not to be limited to the shape given the product 152 in Fig. 24, but is intended to include any shaping device that may be desirably used to effect a given shape.

Without further elaboration, the foregoing will so fully explain the gist of my invention that others may, by applying current knowledge, readily adopt the same for use under varying conditions of service, without eliminating certain features which may properly be said to constitute the essential items of novelty involved, which items are intended to be defined and secured to me by the following claims.

I claim:

1. Dough cutting apparatus comprising cutting means including a carriage having cutter mounting means thereon for interchangeably receiving cutters of predetermined cutting capacities, a traveling surface for feeding dough to be cut past the cutters, means for moving said carriage and cutters toward said traveling surface to effect a cutting operation, means for moving said carriage and cutters in the direction of travel of said traveling surface during said cutting operation, and a drive for said last means, said drive including a mounting for receiving one of a number of interchangeable pattern members for determining the distance said cutting means moves in the direction of movement of said traveling surface during each cycle of operation, said drive maintaining a predetermined speed relationship between said movements irrespective of the cutting capacity of the cutters employed.

2. Dough cutting apparatus comprising a traveling surface for conveying dough to be cut, cutting means including cutter mounting means for interchangeably receiving cutters arranged to cut different lengths and have different cutting capacities with respect to the total cut from the advancing edge of the dough upon each cutting operation, means for bringing said cutters into cutting relation with said traveling surface to effect a cutting operation, and means for moving said cutting means in the direction of travel of said traveling surface during each cutting operation and thereafter to return the same to its original position, said means including a mounting for receiving one of a number of interchangeable pattern members for determining the distance said cutting means moves in the direction of movement of the traveling surface during each cycle of operation, the last said means maintaining a predetermined speed relationship between said movements irrespective of the cutting capacity of the cutters employed.

3. Dough cutting apparatus comprising a traveling surface for conveying dough to be cut, cutting means including cutter mounting means for interchangeably receiving cutters arranged to cut different lengths and have different cutting capacities with respect to the total cut from the advancing edge of the dough upon each cutting operation, means for moving said cutters substantially perpendicularly to and toward said traveling surface to effect a cutting operation, driving means for simultaneously moving said cutters at substantially the same speed and in the same direction as said traveling surface, said driving means including a mounting for receiving one of a number of interchangeable pattern members, the stroke of said cutters in the direction of said traveling surface having a predetermined speed relation to the movement of said traveling surface during each cycle of operation of said cutting means, said driving means maintaining said speed relation upon each stroke irrespective of the cutting capacity of said cutters employed.

4. Dough cutting apparatus comprising cutting means having mounting means for interchangeably receiving cutters of predetermined cutting capacities, a traveling surface for feeding dough to be cut past said cutters, and a drive for moving said cutters substantially perpendicularly to and toward said traveling surface to effect a cutting operation, said drive including means for simultaneously moving said cutters at the same speed and in the same direction as said traveling surface, said drive also including a mounting for receiving one of a number of interchangeable pattern members for determining the distance said cutters move in the direction of movement of the traveling surface during each cycle of operation, said drive maintaining a predetermined speed relationship between said movements irrespective of the cutting capacity of the cutters employed.

5. Dough cutting apparatus comprising a traveling surface for conveying dough to be cut, cutting means including cutter mounting means for interchangeably receiving cutters arranged to cut different lengths and have different cutting capacities with respect to the total cut from the advancing edge of the dough upon each cutting operation, and a drive for said cutters including a mounting for receiving one of a number of interchangeable pattern members for determining the distance said cutters move in the direction of movement of said traveling surface during each cycle of operation, said drive maintaining a predetermined speed relationship between said movements irrespective of the cutting capacity of the cutters carried by said mounting means.

6. Dough cutting apparatus comprising cutting means adapted to carry a predetermined number of cutters, a traveling surface for feeding dough to be cut past said cutters, a drive for said cutters and said traveling surface, said drive including means for moving said cutters perpendicularly toward said traveling surface to effect a cutting operation, means for moving said cutters at the same speed and in the same direction as said traveling surface during said cutting operation and to return said cutters to their original position upon completion of said cutting operation, said drive including mechanism for synchronizing the horizontal and vertical movements of said cutters with the movement of said traveling surface, said mechanism including means for determining the distance said cutters move in the direction of movement of said traveling surface during each cycle of operation, said drive maintaining a predetermined speed relationship between said movements irrespective of the length of cut to be made by said cutters.

7. Dough cutting apparatus comprising cutting means having cutters therefor, a traveling surface for feeding dough to be cut past said cutters, means for moving said cutters toward said traveling surface to effect a cutting operation, a drive for said means, means for moving said cutters in the direction of movement of said traveling surface and for returning said cutters to their original position, a second drive for said last means, a source of power for said drives, and tripping means operable by said second drive to connect said first drive to said source of power during each cycle of operation to effect movement of said cutters toward said traveling surface to effect a cutting operation while said cutters are moving in the direction of travel of said traveling surface.

8. Dough cutting apparatus comprising cutting means having cutters therefor, a traveling surface for feeding dough to be cut past said cutters, means for moving said cutters in the same direction as said traveling surface, means for moving said cutters perpendicularly toward said traveling surface to effect a cutting operation, a source of power, a drive from said source to each said means, a clutch in the drive of said perpendicularly moving means, and a tripping device for said clutch for connecting said drive when said cutters are moving in the same direction as said traveling surface.

9. Dough cutting apparatus comprising cutting means, a traveling surface for conveying dough to be cut past said cutting means, a carriage for said cutting means, means for vertically moving said cutting means to bring the same against said traveling surface to effect a cutting operation, and means for moving said carriage in the same direction and parallel to said traveling surface while said cutters are effecting a cutting operation and for returning the same to its original position when the cutting operation is completed, said carriage moving means comprising a swinging bar connected at one end to said carriage, a toothed segment at the opposite end of said bar, and a rotating element having a toothed periphery for engagement with said tooth segment, the teeth of said rotating element being arranged in spaced groups with barren spaces therebetween, the number of teeth in each of said groups determining the swinging stroke of said bar and the distance said carriage moves parallel to said traveling surface, said barren spaces allowing a return of said bar at the end of its said swinging stroke.

10. Dough cutting apparatus comprising cutting means, a traveling surface for feeding dough to be cut past said cutting means, a carriage for said cutting means, means for vertically moving said cutting means to effect a cutting operation, and means for moving said carriage in the direction of said traveling surface while said cutters are effecting a cutting operation and for returning the same to its original position when the cutting operation is completed, said carriage moving means including a toothed segment, a member movable by the same, and a rotating element having a toothed periphery for engagement with said toothed segment, the teeth of said rotating element being arranged in spaced relation with barren spaces therebetween, the number of teeth in each of said groups determining the movement of said member and the distance said carriage moves in the direction of said traveling surface, said barren spaces allowing a return of said member at the end of its said movement by said toothed segment.

11. Dough cutting apparatus comprising a support, a traveling surface on said support for feeding dough to be cut, cutting means including a carriage, a cutter head and cutters carried by said head, an overhead structure carried by said support for mounting said cutting means above said traveling surface including a bed plate for said carriage along which said carriage is adapted to move parallel to said traveling surface and mechanism for reciprocating said cutter head and cutters while said carriage is moved along said bed plate, and a drive for both said carriage and said reciprocating mechanism comprising rocker arms on opposite sides of said traveling surface for reciprocating said carriage upon said bed plate, a link for operating said rocker arms, a toothed segment at one end of said link, a gear for said segment, and a connection synchronized with the operation of said gear for driving said reciprocating mechanism.

STANLEY A. KRETCHMAN.